(12) United States Patent
Abuzeid et al.

(10) Patent No.: US 6,473,668 B2
(45) Date of Patent: Oct. 29, 2002

(54) INTELLIGENT MINIENVIRONMENT

(75) Inventors: Salem Abuzeid, San Ramon; Xiaohua George He, Menlo Park; George Tannous, Santa Clara, all of CA (US)

(73) Assignee: Asyst Technologies, Inc., Fremont, CA (US)

( * ) Notice: Subject to any disclaimer, the term of this patent is extended or adjusted under 35 U.S.C. 154(b) by 0 days.

(21) Appl. No.: 09/873,691

(22) Filed: Jun. 4, 2001

(65) Prior Publication Data

US 2002/0030113 A1 Mar. 14, 2002

Related U.S. Application Data

(63) Continuation of application No. 09/039,808, filed on Mar. 16, 1998, now abandoned.

(51) Int. Cl.$^7$ .......................... G06F 19/00; B65G 43/00
(52) U.S. Cl. .................. 700/121; 198/810.01; 236/51; 454/184; 414/148
(58) Field of Search .................. 236/51, 49.3; 454/187, 454/184, 255; 700/95, 121, 277; 198/341.01, 810.01; 414/148

(56) References Cited

U.S. PATENT DOCUMENTS 5,279,458 A * 1/1994 De Wolf et al. .............. 236/47
5,538,471 A * 7/1996 Guiles, Jr. .................. 454/238
5,682,949 A * 11/1997 Ratcliffe et al. ............. 165/209
5,943,230 A * 8/1999 Rinnen et al. ......... 427/255.1 X
6,000,830 A * 12/1999 Asano et al. ........... 700/121 X

FOREIGN PATENT DOCUMENTS

| JP | 60164141 | 8/1985 |
| JP | 04103937 | 4/1992 |
| JP | 06260379 | 9/1994 |
| JP | 09053847 | 2/1997 |

* cited by examiner

Primary Examiner—William Wayner
(74) Attorney, Agent, or Firm—O'Melveny & Myers LLP

(57) ABSTRACT

An intelligent minienvironment control system designed to optimize the minienvironment performance, improve the protection for the multi-million dollar equipment within a fab, and to improve the safety conditions for fab personnel. The intelligent minienvironment control system is comprised of a plurality of minienvironment control and monitoring systems (MCMSs), one such system being associated with each minienvironment in the fab. The MCMSs continuously monitor the environmental conditions within the minienvironments. Each of the MCMSs are linked together in a local area network to form an integrated fab-wide minienvironment management system. The management system also includes workstations linked to the network for storing historical data for, and allowing remote access to, each of the MCMSs in the system.

6 Claims, 2 Drawing Sheets

INTELLIGENT MINIENVIRONMENT

This application is a Continuation of Ser. No. 09/039,808, filed Mar. 16, 1998, now abandoned.

BACKGROUND OF THE INVENTION

1. Field of the Invention

The present invention relates to minienvironments in which semiconductor wafers may be processed, and in particular to an integrated system for monitoring and controlling all minienvironment functions and parameters.

2. Description of Related Art

A SMIF system proposed by the Hewlett-Packard Company is disclosed in U.S. Pat. Nos. 4,532,970 and 4,534,389. The purpose of a SMIF system is to reduce particle fluxes onto semiconductor wafers during storage and transport of the wafers through the semiconductor fabrication process. This purpose is accomplished, in part, by mechanically ensuring that during storage and transport, the gaseous media (such as air or nitrogen) surrounding the wafers is essentially stationary relative to the wafers, and by ensuring that particles from the ambient environment do not enter the immediate wafer environment.

A SMIF system has three main components: (1) minimum volume, sealed pods used for storing and transporting wafers and/or wafer cassettes; (2) an enclosed space, or minienvironment, located on a semiconductor processing tool to provide a miniature clean space (upon being filled with clean air) in which exposed wafers and/or wafer cassettes may be transferred to and from the interior of the processing tool; and (3) an interface for transferring the wafers and/or wafer cassette between the SMIF pods and the SMIF minienvironment without exposure of the wafers or cassettes to particulates. Further details of one proposed SMIF system are described in the paper entitled "SMIF: A TECHNOLOGY FOR WAFER CASSETTE TRANSFER IN VLSI MANUFACTURING," by Mihir Parikh and Ulrich Kaempf, Solid State Technology, July 1984, pp. 111–115.

Systems of the above type are concerned with particle sizes which range from below 0.02 microns ($\mu$m) to above 200 $\mu$m. Particles with these sizes can be very damaging in semiconductor processing because of the small geometries employed in fabricating semiconductor devices. Typical advanced semiconductor processes today employ geometries which are one-half $\mu$m and under. Unwanted contamination particles which have geometries measuring greater than 0.1 $\mu$m substantially interfere with 1 $\mu$m geometry semiconductor devices. The trend, of course, is to have smaller and smaller semiconductor processing geometries which today in research and development labs approach 0.1 $\mu$m and below. In the future, geometries will become smaller and smaller and hence smaller and smaller contamination particles become of interest.

In order to transfer wafers and/or a wafer cassette from within the SMIF pod to within a minienvironment on a processing tool, a door of the pod is supported on an I/O port of the minienvironment. The pod is designed so that the pod door overlies a port door covering the I/O port of the minienvironment, and the pod cover overlies a port plate surrounding the port door. Once located at the I/O port, mechanisms within the port door release and separate the pod door from the pod cover. Thereafter, the port door and pod door are brought into the I/O minienvironment, and moved together either up, down, or to the side of the minienvironment port to clear a path for the wafers and/or cassette to be transferred through the port. While the port and pod doors are retracted within the minienvironment, the pod cover generally remains affixed to the I/O port to prevent contaminants from entering the minienvironment.

It is extremely expensive to maintain cleanroom conditions, and it would be desirable not to have to provide clean air exterior to the minienvironments inside the fab. However, where the air surrounding a minienvironment includes large numbers of a particulates per unit volume, it becomes more difficult to maintain conditions within the minienvironment at the desired cleanroom level. At present, it is desirable to maintain a better than class 1 cleanroom environment within a minienvironment, while allowing the ambient conditions within the fab to be about class 1000 and as high as class 100,000. Such disparate cleanroom conditions inside and outside the minienvironment put strict requirements on the differential pressure control system associated with a minienvironment to ensure that the ambient particulates do not enter the minienvironment.

In addition to differential pressure, it is critical to closely monitor and control other environmental conditions within the minienvironment, such as for example the particle count, temperature and humidity. Particle Measuring Systems, Inc. of Boulder, Colo. provides a software package entitled "Facility-View" which allows an operator to collect, display and analyze data pertaining to certain cleanroom environmental conditions, such as for example pressure, temperature, and particle count. Another cleanroom monitoring system is available from Lighthouse Associates of Milpitas, Calif. The Lighthouse monitoring system is also capable of monitoring certain cleanroom conditions, such as for example pressure, temperature, relative humidity, and particle count and then presenting real-time data in a variety of formats including graphs, charts, data tables and maps.

Up until now, no cleanroom monitoring system has offered fully integrated monitoring and control of all parameters within each minienvironment on a tool and fab-wide basis. While it is known to monitor a variety of parameters, each of those parameters are conventionally monitored by a separate controller and/or a separate network connection to a host system. Moreover, conventional cleanroom monitoring systems have not allowed expansion of the system once the system is in place within a cleanroom.

SUMMARY OF THE INVENTION

It is therefore an advantage of the present invention to provide a fully integrated minienvironment control and monitoring system on both a tool and fab-wide level.

It is a further advantage of the present invention to provide an integrated system providing a comprehensive monitoring and control of all functions and parameters within a minienvironment.

It is another advantage of the present invention to provide a single controller, having a single network connection, for controlling and monitoring all environmental conditions within a minienvironment.

It is a further advantage of the present invention to connect all minienvironments within a fab into a local area network to allow communication between the minienvironments and a host system, and to allow remote monitoring and control of each minienvironment.

It is another advantage of the present invention to provide an integrated communication link with choice of standard protocols to allow integration of minienvironment control with other equipment control and automation systems.

It is a still further advantage of the present invention to provide an automatic protection and early warning system for equipment to reduce downtime and equipment maintenance.

It is a further advantage of the present invention to provide a system for collecting and preserving historical data from each minienvironment for minienvironment quality verification and for problem identification.

It is yet another advantage of the present invention to provide a disaster control and prevention system through early detection and immediate response to hazardous conditions such as smoke, fire, or chemical spill.

These and other advantages are provided by embodiments of the present invention which in general relate to an intelligent minienvironment control system. The system is designed to optimize the minienvironment performance, improve the protection for the multi-million dollar equipment within a fab, and to improve the safety conditions for fab personnel. The intelligent minienvironment control system is comprised of a plurality of minienvironment control and monitoring systems (MCMSs), one such system being associated with each minienvironment in the fab. The MCMSs continuously monitor environmental conditions within the minienvironments relating for example to differential pressure, airborne particulate level, temperature, humidity and smoke. Should any of the environmental parameters deviate from their predetermined and preset values, the parameter is quickly corrected and/or other appropriate action taken. For example, the smoke sensors are provided both within and outside of a minienvironment. If smoke is detected within or around a minienvironment, the associated MCMS automatically sounds an alarm, shuts down the air circulation system within the minienvironment to minimize the possibility of contaminating the equipment, and/or activates a sprinkler system within the minienvironment Each of the MCMSs are linked together as part of a local area network forming an integrated fab-wide minienvironment management system. The system utilizes IP/IPX protocols and allows any computer supporting IPX protocols to communicate with the MCMSs. The management system also includes workstations linked to the network for storing historical data for, and allowing remote access to, each of the MCMSs in the system.

BRIEF DESCRIPTION OF THE DRAWINGS

The present invention will now be described with reference to the figures in which.

DETAILED DESCRIPTION

Figure 1:
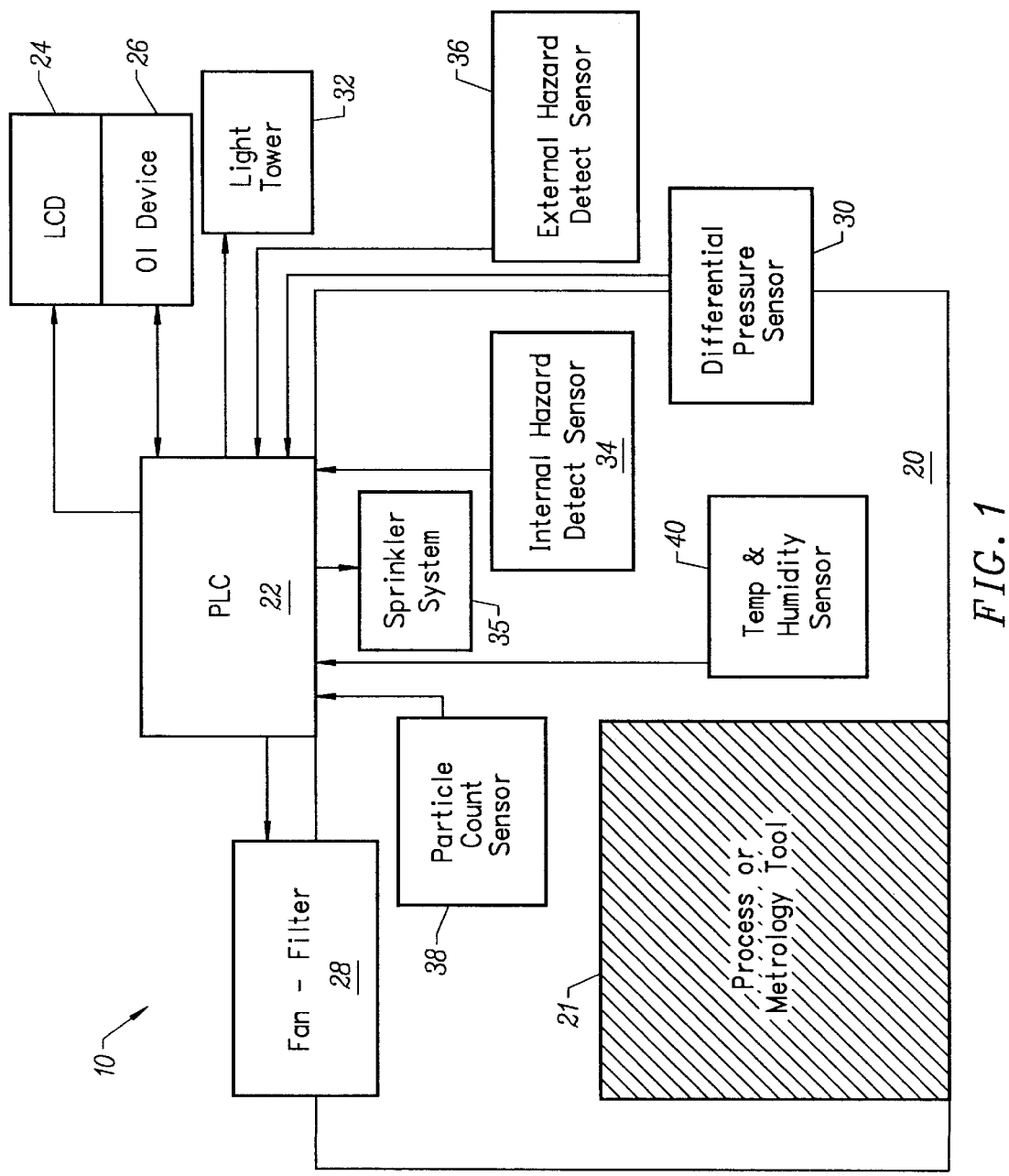
FIG. 1 is a schematic representation of a minienvironment including the intelligent minienvironment control and monitoring system according to the present invention.

The present invention will now be described with reference to FIGS. 1–2 which in general relate to an intelligent minienvironment control system for providing fully automated and integrated minienvironment control on a tool and fab-wide level. At the tool level, as explained hereinafter, the overall intelligent control system includes a minienvironment control and monitoring system (MCMS) implemented by a controller, such as for example a programmable logic controller, at each minienvironment within a fab. At the fab-wide level, as explained hereinafter, the overall intelligent control system includes an integrated fab-wide minienvironment management system which links each MCMS together in a local area network. In addition to each of the MCMSs, the network may additionally include one or more workstations for recording historical data and for allowing on-site or remote access to each MCMS.

An MCMS 10 will now be described with reference to FIG. 1. The MCMS 10 within each minienvironment provides comprehensive and fully integrated monitoring and control of all functions and environmental parameters within the minienvironment. Such environmental parameters may include but are not limited to differential pressure, hazardous condition detection, particle count, temperature, humidity, vibration, air flow velocity, resistivity, pH, conductivity, and total organic carbon (TOC) content.

The MCMS 10 within a minienvironment 20 includes a programmable logic controller (PLC) 22 preferably mounted within a base of the minienvironment, outside of the controlled area. The PLC 22 includes a power base, a central processing unit, an analog I/O module and expansion slots for other modules such as an ethernet card and additional plug-in I/O modules. As described below, the analog I/O module may be provided with a plurality of channels, one channel for each of the sensors within the minienvironment. Alternatively, each sensor may include its own plug-in I/O module fitting within the PLC expansion slot. It is understood that other processing units, such as for example relay logic controllers, may be used in place of PLC 22 in alternative embodiments of the invention.

PLC 22 implements a control algorithm for each sensor within the minienvironment. As shown in FIG. 1, the PLC 22 may communicate with an LCD 24 for providing a visual indication of the various parameters monitored by the PLC. An operator interface device 26 may additionally be coupled to the PLC 22 for allowing operator access to, and manual control of, the PLC. The LCD 24 may be included as part of or separate from the operator interface 26.

The PLC 22 together with a fan-filter unit 28 controller and differential pressure sensor 30 comprise the differential pressure control. It is important to maintain the minienvironment 20 at a slightly elevated pressure with respect to the surrounding ambient environment. Thus, air flows out of the minienvironment, as opposed to the contaninant-rich ambient air being drawn into the minienvironment. Additionally, it is desirable to provide a purging gas flow through the minienvironment for carrying away particulates from within the minienvironment.

To maintain the positive differential pressure and purging flow, minienvironment 20 includes the fan-filter unit 28 of conventional design. The fan-filter unit provides a flow of ultraclean air into the minienvironment. In order to ensure the fan-filter unit 28 is supplying the proper volumetric flow into the minienvironment, the differential pressure sensor 30 is provided for measuring a difference between the pressure within the minienvironment and ambient pressure. Both the fan-filter 28 and differential pressure sensor 30 are coupled to the PLC 22 via the I/O module plugged into the PLC. The differential pressure sensor 30 takes frequent readings (such as for example every 10 milliseconds) of the pressure differential, to thereby provide the PLC with a real-time reading of the difference between the internal and external pressures.

The differential pressure control is capable of operating in one of four modes: AUTO, MANUAL, AUTO TUNE, and AUTO ZERO. The AUTO mode is a normal operating mode in which the differential pressure control automatically adjusts the fan speed continuously to maintain a substantially constant differential pressure within the minienvironment. As explained hereinafter, an optimal differential pressure value may be stored within the PLC. The feedback from differential pressure sensor 30 is forwarded to the PLC so that the PLC can compare on a near constant basis the actual differential pressure against the expected setpoint value. If there is a variance between the actual and expected setpoint differential pressure values, the PLC sends a signal to the fan-filter to increase or decrease flow into the minienvironment to thereby provide closed loop feedback control of the differential pressure. In particular, the fan includes a fan motor control. The PLC 22 sends a signal to the fan motor control to increase or reduce the speed of the fan to thereby increase or reduce the volume of gas flowing into the minienvironment.

In MANUAL mode, the volume of air flowing into the minienvironment through the fan-filter may be manually adjusted via the operator interface 26. The MANUAL mode is preferably used as a temporary back-up operation mode when the PLC 22 is off-line. In this mode, air flow through the fan is kept constant regardless of variations in the differential pressure.

Conventional differential pressure sensors are subject to drift with use. Therefore, it is necessary to calibrate the differential pressure sensor upon initial use to ensure a zero differential reading when in fact there is a zero pressure differential between the internal and external environments. In conventional pressure monitoring systems, this initial calibration must be performed by an operator, and is in general time consuming. It is a feature of the present invention that the PLC 22 automatically performs the initial pressure sensor calibration. Such automatic calibration simplifies operation of the control system, and reduces start up times as compared to conventional monitoring and control systems.

The automatic initial pressure sensor calibration may be performed by the PLC in the AUTO ZERO mode. In this mode, the PLC automatically takes pressure readings from a volume of gas (the readings are taken on the same volume to ensure that there will be no actual pressure differential for the readings). The PLC then makes an adjustment to the pressure sensor if the sensor registers a non-zero differential pressure. As an alternative to the AUTO ZERO mode, zero calibration of the differential pressure sensor may be manually performed in MANUAL mode via the operator interface.

It is important to precisely control the magnitude of the pressure differential between the interior and exterior of the minienvironment. Where the pressure differential is too small, contaminants from the ambient environment can potentially enter into the minienvironment. Where the pressure differential is too large, turbulent flow and localized low pressure zones may be created within the minienvironment that can result in air from outside of the minienvironment being drawn into the minienvironment. As minienvironment and tool geometries vary, the optimal fan-filter capacities must be calculated and the differential pressure for that particular system must be tuned into the PLC.

The optimal pressure differential may be automatically determined according to the present invention with the PLC in AUTO TUNE mode. In AUTO TUNE mode, the differential pressure control automatically varies fan speed while noting the differential pressure response. Once sufficient observation has been made, AUTO TUNE mode may automatically select the optimal values for differential pressure control for that particular minienvironment. As an alternative to the AUTO TUNE mode, the optimal differential may be manually set in MANUAL mode via the operator interface.

Another feature of the comprehensive, integrated control and monitoring system according to the present invention is a self-diagnostic feature of the individual components and sensors within the minienvironment. The PLC may perform a diagnostic analysis of the differential pressure sensor electronic circuitry once during a preset time interval. In the event an error is detected, the PLC stops the closed loop feedback adjustment of the fan-filter flow, and sounds an alarm. As would be understood by those of skill in the art, this alarm may comprise a visual read-out on the LCD 24, an activation of an indicator light in a light tower 32, or some other similar alert mechanism.

Another feature of the intelligent monitoring and control system according to the present invention is detection and response to a hazardous condition. Minienviroriments and wafer fabs in general house multi-million dollar equipment, which equipment may be easily ruined in the presence of a hazardous condition such as for example smoke, fire or chemical spill. In order to protect the equipment, as well as to provide for the safety the operators within a wafer fab, the present invention includes interior and exterior hazard detect sensors 34 and 36, respectively. It is understood that the sensors 34 and 36 may in fact comprise a sensor group comprised of various known sensors capable of detecting vario us hazardous conditions, including smoke, fire, and chemical spills.

In the event interior sensor 34 detects a hazardous condition such as for example smoke or fire, it immediately sounds an alarm, and shuts down the fan-filter unit to minimize the circulation of smoke within the minienvironment and to contain the smoke or f ire within the minienvironment to prevent spreading of the smoke or ie to other locations in the fab. In the event internal hazard detect sensor 34 detects smoke or fire, the PLC may additionally activate a localized sprinkler system 35 within the minienvironment. As would be appreciated by those of skill in the art, such sprinkler systems may include carbon dioxide, halon or other known fire suppressants.

In the event a hazard is detected by exterior hazard detect sensor 36, the PLC response is similar to that described above with respect to detection by the interior hazard detect sensor. The PLC sounds an alarm, shuts off the fan-filter unit in an attempt to contain the hazardous condition outside of the minienvironment, and activates a fire extinguisher. External hazard detect sensor 36 may also comprise a device for detecting harmful fumes in the wafer fab. As with the differential pressure sensor 30, the sensors 34 and 36 together with PLC 22 may include a self-diagnostic circuit for monitoring the electronic sensor circuits, and for sounding an alarm in the event an error is detected.

The control system according to the present invention may further include monitoring of a particle count within the minienvironment 20 by means of the PLC 22 and a particle count sensor 38 mounted within the minienvironment. As would be appreciated by those of skill in the art, particle count sensor 38 may measure liquid, gas, and/or aerosol content per unit volume within the minienvironment. Particle count sensor 38 may take a reading once during a preset time interval (for example 10 milliseconds) and forward the reading to the PLC via the I/O module. The PLC checks the reading against an expected setpoint particle count, and sounds an alarm in the event of a deviation between the actual and expected setpoint particle count value. As with the above-described sensors, the control system may include a self-diagnostic routine to monitor the particle count sensor electronic circuitry, and to sound an alarm or send an indication in the event an error is detected. The feedback control of the particle count within the minienvironment reduces the downtime of the minienvironment, which time would otherwise be necessary to certify the cleanliness of the air within the minienvironment.

The control system according to the present invention may further include temperature and humidity control via the PLC 22 and a temperature and humidity sensor 40. The sensor 40 may be mounted within the minienvironment and takes a reading of the temperature and humidity levels within the minienvironment once during a preset time interval (such as for example 10 milliseconds). This reading is then forwarded to the PLC via the plug-in I/O module so that the PLC may compare the actual reading against preset expected setpoint readings. The setpoint readings may be initially input into the PLC 22 via the operator interface 26. In the event the actual reading varies from the expected, the temperature and/or humidity of the gas input through the fan-filter may be adjusted accordingly to provide closed loop feedback control of the temperature and humidity within the minienvironment. The temperature and humidity control system may include a self-diagnostic routine to monitor the sensor electronic circuitry, and to sound an alarm or send an indication in the event an error is detected.

It is understood that the various sensors described above within minienvironment 20 are merely exemplary, and that an MCMS 10 may include more or less sensors than disclosed above within the minienvironment in alternative embodiments of the invention. Moreover, in addition to monitoring and controlling various environmental conditions within the environment via the above-described sensors, it is understood that the PLC 22 may additionally monitor and control the various components within the environment used in connection with the handling and processing of wafers. For example, in addition to the fan-filter unit 28, minienvironments typically include a wafer handling robot capable of transferring wafers between the wafer cassette and the process or metrology tool 21. The PLC in embodiments of the invention may be programmed to monitor and control the operation of such components, as well as to perform diagnostics on such components.

As set forth above, the monitoring and control of each function and parameter of a minienvironment may be integrated into a comprehensive system governed by a single PLC 22 having a single network connection. This provides an improvement over the prior art which included separate controllers for the various sensors within the minienvironment and/or separate connections between the sensors and a remotely located controller. A further advantage is provided by the present invention in that the various control systems within the PLC 22 may communicate with each other. Thus, for example, where the temperature control system detects a variation from the desired temperature, the PLC may in part correct this deviation by increasing air flow from the fan-filter via the pressure differential control system. The intelligent controller according to the present invention further allows the integration of minienvironment control with other equipment and material control and automation systems to optimize cycle time and yield. The above-described features are not found in conventional systems.

Moreover, it is another feature of the present invention to provide a modular control system in which sensors may be added to or removed from a minienvironment 20 after the control system has been installed and is operating within a fab. The PLC 22 is provided with the necessary software to control and monitor a wide variety of sensors, even where the configured system utilizes less than a full compliment of sensors. Thus, where a customer has purchased a minienvironment of a particular configuration, the minienvironment may thereafter be modified by adding additional sensors or removing the existing sensors. In order to add an additional sensor, the sensor may simply be plugged into a channel in the existing I/O module in the PLC, or into an additional I/O module that is plugged into an expansion slot in the PLC. As the PLC already includes software capable of recognizing and operating with that sensor, the addition of the sensor is simply a plug and play operation.

Figure 2:
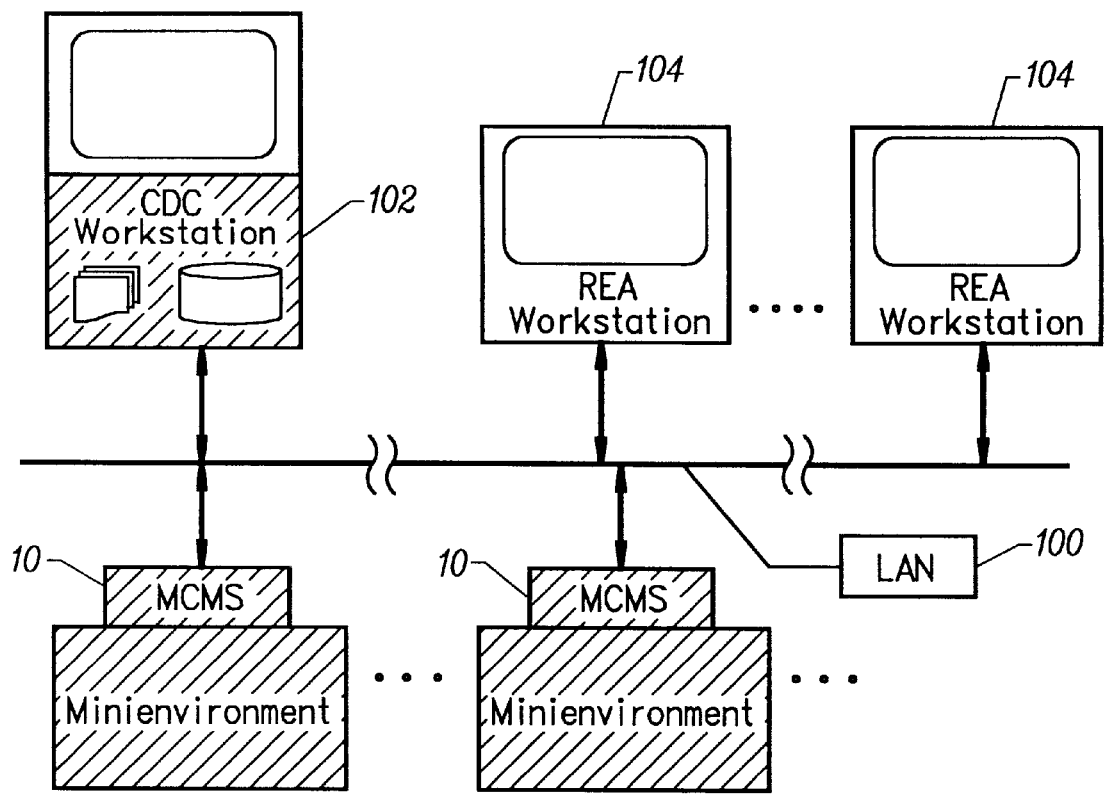
FIG. 2 is a schematic representation of the integrated fab-wide minienvironment management system according to the present invention set up as a local area network within and remote from a fab.

As set forth above, in addition to the MCMSs 10, the overall intelligent minienvironment control according to the present invention further includes an integrated fab-wide minienvironment management system as shown in FIG. 2. Each PLC 22 of an MCMS preferably includes an ethernet I/O module allowing each MCMS 10 to be connected to each other as part of a fab-wide local area network (LAN) 100. The ethernet plug-in modules preferably support IP/IPX protocol and allow any computer supporting IPX protocol to communicate with the MCMSs 10. It is understood that other network protocols and other network connections may be provided instead or in addition to that described above.

In addition to the network connection, the MCMSs 22 may also communicate with a SMART tag provided on the various SMIF pods (not shown) entering into the minienvironment. The SMART tag system for monitoring and identifying wafer lots around the fab is described for example in U.S. Pat. Nos. 4,974,166; 5,097,421; and 5,166,884, which patents are assigned to the owner of the present invention and which patents are hereby incorporated by reference in their entirety herein. The PLC may communicate with the pod SMART tags via wireless transmission to, for example, identify pods to verify that a particular wafer lot is properly located at a particular minienvironment.

In addition to the MCMSs 10, the integrated fab-wide minienvironment management system preferably includes at least one workstation 102 dedicated to collecting and storing data from each MCMS 10 in the fab. This historical data may be used for quality verification purposes to verify proper performance of each of the minienvironments and components therein. Additionally, the historical data may be used for problem identification. For example, where a problem arises, the historical data from workstation 102 may be reviewed to identify the particular source of the problem. Further still, the provision of a centralized data storage location within workstation 102 obviates the need for a technician to visit each minienvironment within a fab for data collection. Upon access, the data stored within centralized data storage workstation 102 may be presented in a wide variety of formats including graphs, charts, data tables, maps, or other convenient, easy to use formats.

The integrated fab-wide minienvironment management system may additionally include at least one remote access workstation 104 dedicated to providing remote access to the individual MCMSs 10 and/or the centralized data collection workstation(s) 102. The workstations 104 may be located within the fab, or at any remote location, connecting the network via a modem, ISDN line, or any other known communication protocol. It is contemplated that the remote access workstations 104 be used by managers, supervisors, engineers, etc. to allow maintenance, modification, administration, and supervision of the network and MCMSs. As is known in the art, various security protocols may be provided to gain access to the network and to restrict the level of access to the network.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We Claim:

1. A control system for an environment isolated from ambient atmospheric conditions, comprising:

a plurality of sensors, each sensor measuring an environmental parameter within the isolated environment and respectively generating a corresponding monitoring signal;

an operational component for handling an article to be processed in the isolated environment in response to a control signal, said operational component generating a corresponding monitoring signal;

an environmental control device adapted to receive another control signal, and adapted to control an environmental parameter measured by at least one of said plurality of sensors;

at least one exterior sensor measuring an environmental parameter outside the isolated environment and generating a corresponding monitoring signal; and a programmable controller responsive to the monitoring signals, said programmable controller processing said monitoring signals and generating the control signals based on the monitoring signals.

2. A control system for an environment isolated from ambient atmospheric conditions, comprising:

a plurality of sensors, each sensor measuring an environmental parameter within the isolated environment and respectively generating a corresponding monitoring signal;

an operational component for handling an article to be processed in the isolated environment in response to a control signal, said operational component generating a corresponding monitoring signal;

an environmental control device adapted to receive another control signal, and adapted to control an environmental parameter measured by at least one of said plurality of sensors;

a programmable controller responsive to the monitoring signals, said programmable controller processing said monitoring signals and generating the control signals based on the monitoring signals; and a workstation in communication with said programmable controller, said workstation being adapted to provide access to said programmable controller.

3. A control system for an environment isolated from ambient atmospheric conditions, comprising:

a plurality of sensors, each sensor measuring an environmental parameter within the isolated environment and respectively generating a corresponding monitoring signal;

an operational component for handling an article to be processed in the isolated environment in response to a control signal, said operational component generating a corresponding monitoring signal;

an environmental control device adapted to receive another control signal, and adapted to control an environmental parameter measured by at least one of said plurality of sensors; and a programmable controller responsive to the monitoring signals, said programmable controller processing said monitoring signals and generating the control signals based on the monitoring signals, said programmable controller further being expandable in order to monitor additional sensors and operational components.

4. An integrated management system for environments isolated from ambient atmospheric conditions, comprising:

a plurality of isolated environment control systems, each isolated environment control system comprising:

a plurality of sensors, each sensor measuring an environmental parameter within the isolated environment and respectively generating a corresponding monitoring signal;

an environmental control device adapted to receive a control signal, and adapted to control an environmental parameter measured by at least one of said plurality of sensors; and a programmable controller responsive to the monitoring signals, said programmable controller processing said monitoring signals and generating the control signal based on the monitoring signals, and further adapted to monitor and control an operational component in at least one of said plurality of isolated environments; and a workstation in communication with said programmable controller of each of said plurality of isolated environment control systems, said workstation being adapted to monitor each sensor and to control each environmental control device through the respective programmable controller.

5. An integrated management system for environments isolated from ambient atmospheric conditions, comprising:

a plurality of isolated environment control systems, each isolated environment control system comprising:

a plurality of sensors, each sensor measuring an environmental parameter within the isolated environment and respectively generating a corresponding monitoring signal;

an environmental control device adapted to receive a control signal, and adapted to control an environmental parameter measured by at least one of said plurality of sensors; and a programmable controller responsive to the monitoring signals, said programmable controller processing said monitoring signals and generating the control signal based on the monitoring signals; and a workstation in communication with said programmable controller of each of said plurality of isolated environment control systems, said workstation being adapted to monitor each sensor, to control each environmental control device through the respective programmable controller, and to record historical data relating to the environmental parameters.

6. An integrated management system for environments isolated from ambient atmospheric conditions, comprising:

a plurality of isolated environment control systems, each isolated environment control system comprising:

a plurality of sensors, each sensor measuring an environmental parameter within the isolated environment and respectively generating a corresponding monitoring signal;

an environmental control device adapted to receive a control signal, and adapted to control an environmental parameter measured by at least one of said plurality of sensors;

a programmable controller responsive to the monitoring signals, said programmable controller processing said monitoring signals and generating the control signal based on the monitoring signals, said programmable controller further being expandable in order to monitor additional sensors and operational components; and a workstation in communication with said programmable controller of each of said plurality of isolated environment control systems, said workstation being adapted to monitor each sensor and to control each environmental control device through the respective programmable controller.

* * * * *